United States Patent
Georgin et al.

(10) Patent No.: US 9,434,369 B1
(45) Date of Patent: Sep. 6, 2016

(54) SYSTEMS AND METHODS FOR DETECTING AN UNCOMMANDED BRAKE OVERDRIVE CONDITION

(71) Applicant: GOODRICH CORPORATION, Charlotte, NC (US)

(72) Inventors: Marc Georgin, Dayton, OH (US); Eric Stein, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/749,382

(22) Filed: Jun. 24, 2015

(51) Int. Cl.
G07C 5/08 (2006.01)
B64D 45/00 (2006.01)
B60T 17/22 (2006.01)

(52) U.S. Cl.
CPC .............. B60T 17/22 (2013.01); B64D 45/00 (2013.01); G07C 5/0808 (2013.01); *B64D 2045/0085* (2013.01)

(58) Field of Classification Search
CPC ..... B60T 17/22; G07C 5/0808; B64D 45/00; B64D 2045/0085
See application file for complete search history.

(56) References Cited

U.S. PATENT DOCUMENTS

| RE36,454 E | 12/1999 | Ball | |
| 8,978,834 B2 | 3/2015 | Cahill | |
| 2005/0269872 A1 | 12/2005 | Ralea | |
| 2008/0154470 A1 | 6/2008 | Goranson | |
| 2016/0031427 A1* | 2/2016 | Yasui | B60T 17/22 |
| | | | 701/70 |

* cited by examiner

*Primary Examiner* — Aaron L Troost
(74) *Attorney, Agent, or Firm* — Snell & Wilmer, L.L.P.

(57) ABSTRACT

A method is provided for detecting an uncommanded brake overdrive condition in an aircraft brake control system. Method comprises monitoring, by an electric brake actuator controller (EBAC) in the brake control system, at least one of the following: a load cell current for deviation from a nominal load cell current and a load cell output signal (LC Sig+) and (LC Sig–) of a plurality of individual load cells and an excitation voltage signal comprising a (Vexc+) signal and a (Vexc–) signal. EBAC detects at least one resistance disturbance indicating the uncommanded brake overdrive condition if load cell current is less than nominal load cell current, if an absolute value of the difference between a sum of LC Sig+LC Sig– for at least one individual load cell and a sum of Vexc++Vexc– is greater than a predefined threshold, or both.

20 Claims, 3 Drawing Sheets

SYSTEMS AND METHODS FOR DETECTING AN UNCOMMANDED BRAKE OVERDRIVE CONDITION

FIELD

The present disclosure relates to braking systems, and more particularly, to methods and systems for detecting an uncommanded brake overdrive condition.

BACKGROUND

Aircraft brake control systems receive input signal(s) indicating, for example the desired actuator braking force or the desired rate of deceleration and transmit an output signal to a brake actuator. The output signal may direct a brake actuator to exert a braking force on a brake stack. The aircraft brake control system may have a sensor that monitors the braking force exerted on the brake stack. An electric brake actuation controller may modulate the output signal to match the applied braking force to a desired braking force. However, connecting wires between the electric brake actuation controller and the load cell may corrode and/or degrade. Thus, the currents, voltages, and/or signals may be degraded. As such, the electric brake actuation controller may provide an output signal directing the brake actuator to exert a force greater than desired. Thus, there may be a force error between the desired braking force and the applied braking force, resulting in potentially dangerous uncommanded brake overdrive condition.

SUMMARY

A method is provided for detecting an uncommanded brake overdrive condition in an aircraft brake control system according to various embodiments. The method comprises monitoring, by an electric brake actuator controller (EBAC) in the brake control system, at least one of the following: a load cell current for deviation from a nominal load cell current and a load cell output signal (LC Sig+) and (LC Sig−) of a plurality of individual load cells and an excitation voltage signal comprising a (Vexc+) signal and a (Vexc−) signal. EBAC detects at least one resistance disturbance indicating the uncommanded brake overdrive condition if load cell current is less than nominal load cell current, if an absolute value of the difference between a sum of (LC Sig+)+(LC Sig−) for at least one individual load cell of the plurality of individual load cells and a sum of (Vexc+)+(Vexc−) is greater than a predefined threshold, or both.

A method for detecting an uncommanded brake overdrive condition in a brake control system for an aircraft is provided in accordance with various embodiments. The method comprises determining, by an electric brake actuator controller (EBAC), a nominal load cell current. The EBAC measures a load cell current of a plurality of individual load cells in parallel. The EBAC is configured to provide the load cell current to the plurality of individual load cells via shared excitation wiring. The EBAC compares the measured load cell current and the nominal load cell current. The EBAC measures a voltage excitation signal comprising Vexc+ and Vexc− and computes a sum thereof. The EBAC measures, for each individual load cell of the plurality of individual load cells, a value of Load Cell Output Signal+ (LC Sig+) and of Load Cell Output Signal− (LC Sig−). The EBAC computes a difference between a sum of (LC Sig+) and (LC Sig−) for each individual load cell and the sum of (Vexc++ Vexc−). The EBAC detects at least one resistance disturbance indicating the uncommanded brake overdrive condition if an absolute value of the difference is greater than a predefined threshold, if the measured load cell current is less than the nominal load cell current, or both.

A brake control system is provided in accordance with various embodiments. The brake control system comprises an electric brake actuation controller ("EBAC"), sense wiring connected to the EBAC, shared excitation wiring connected to the EBAC, and control wiring connected to the EBAC. The EBAC is configured to receive a sensed voltage from each individual load cell of a plurality of individual load cells in parallel via the sense wiring. The EBAC is configured to provide a load cell current to the plurality of individual load cells in parallel via the shared excitation wiring. The EBAC is configured to provide a control voltage to an electric brake actuator ("EBA") via the control wiring. The EBAC is further configured to detect at least one resistance disturbance in the excitation wiring indicating a brake overdrive condition in response to the load cell current being less than a nominal load cell current, if an absolute value of a difference between a sum of load control output signals (LC Sig+) and (LC Sig−) from at least one individual load cell of the plurality of individual load cells and a sum of excitation voltage signals (Vexc+) and (Vexc−) is greater than a predefined threshold, or both.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Various embodiments are directed to systems and methods for detecting an uncommanded brake overdrive conditions. According to various embodiments, an uncommanded brake overdrive condition is indicated by a resistance disturbance in excitation wiring in an aircraft brake control system. The resistance disturbance may cause the actual force applied to a brake to be not intended, not requested, or greater than desired (i.e., an uncommanded brake overdrive condition). By detecting resistance disturbances in the excitation wiring, an uncommanded brake overdrive condition may be detected and substantially prevented, thereby increasing the safety and reliability of the aircraft.

Figure 1:
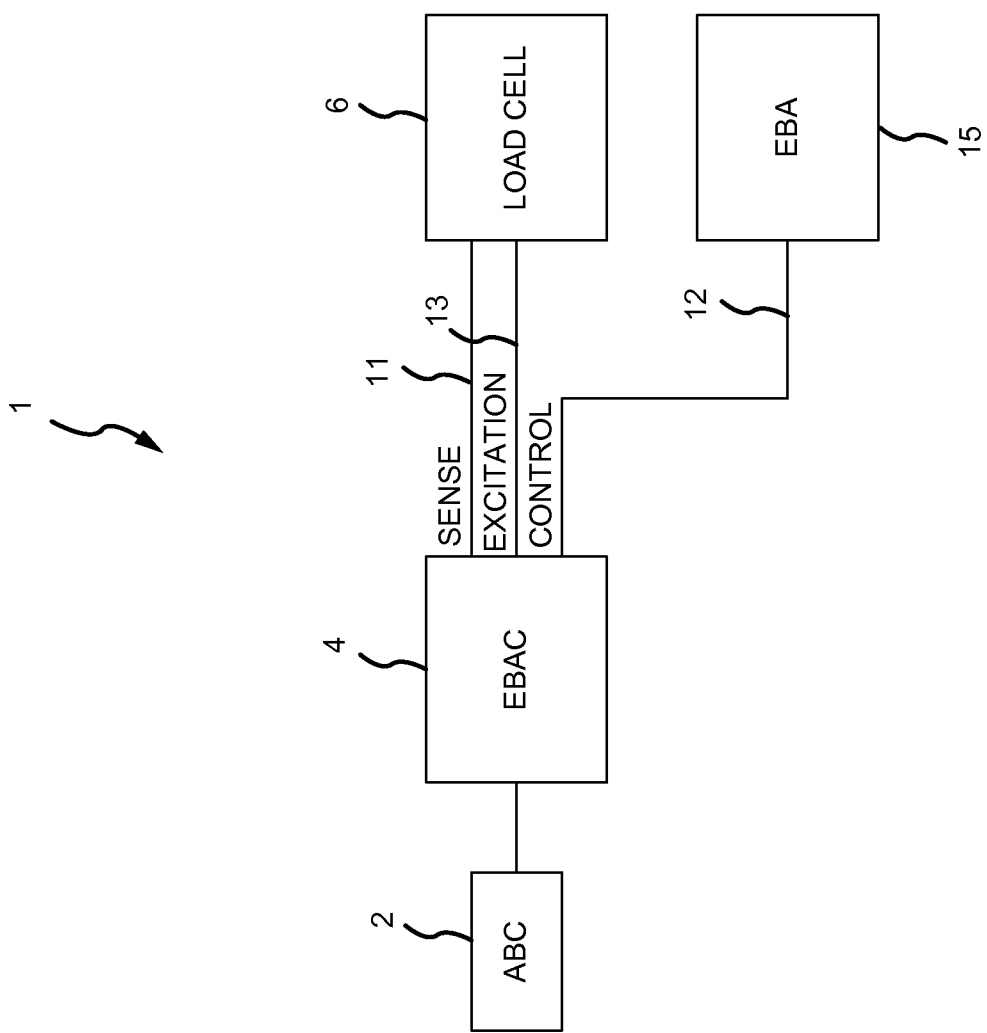
FIG. 1 depicts an exemplary aircraft brake control system, in accordance with various embodiments.

The present disclosure relates to a brake control system, such as an aircraft brake control system. With reference to FIG. 1, in accordance with various embodiments, a brake control system 1 may have an aircraft brake controller 2 ("ABC"), an electrical brake actuation controller 4 ("EBAC"), a load cell 6 ("LC"), and an electric brake actuator ("EBA") 15. While the ABC and EBAC are depicted separately in FIG. 1, it is to be understood that the ABC and EBAC functions may be combined in a single unit. As used hereinafter, unless otherwise specified, the term "EBAC" refers to a separate electrical brake actuation controller 4 or the single unit including ABC and EBAC functions. In various embodiments, the load cell 6 is situated inside the EBA 15. The EBAC 4 may provide force commands or electrical energy to the EBA 15 directing the EBA 15 to cause a brake assembly to mechanically operate, changing the braking force of the aircraft. For example, the EBAC 4 may be responsible for executing brake actuation instructions received from an aircraft brake controller 2 ("ABC"). In this manner, the brakes may be operated. In various embodiments, the EBAC 4 may provide force commands to more than one EBA 15, for example, a first EBA and a second EBA, or any number of EBAs, in order to operate more than one brake assembly, for example, a first brake assembly and a second brake assembly in concert. Each brake assembly may be installed on an aircraft main landing gear.

The force commands and brake actuation instructions may comprise signals from various different sources. For example, the force commands and/or brake actuation instructions may be an interpretation of brake pedal application from pilot input (e.g., an amount of brake pedal deflection). The force commands and/or brake actuation instructions may be an interpretation of manual and/or auto-brake instructions corresponding to a desired aircraft deceleration rate. Furthermore, noise, such as small and/or inadvertent brake movements, for example, pedal movements may be present and may be filtered by at least one of the ABC 2 and/or EBAC 4.

During a braking event, the ABC 2 may provide brake actuation instructions to the EBAC 4 directing a certain percentage of braking force, for example, scaled from about 0% actuation to about 100% actuation. The EBAC 4 may create a force command in response to the brake actuation instruction and/or past or expected brake actuation instructions (such as according to a filter). This force command may correspond to a desired braking force. The force command may be represented by a control voltage applied to control wiring 12. The control wiring 12 may connect the EBAC 4 to an EBA 15. The EBA 15 may actuate in response to the magnitude of the control voltage representing the desired braking force. However, as one may appreciate, the force command may be represented by a current, or by packetized data, or by a waveform, or any mechanism of electronically conveying information as desired.

The electrical brake actuator 15 may be in mechanical communication with a load cell 6. The load cell 6 may comprise a sensor configured to detect the magnitude of the force exerted by the electrical brake actuator 15 on a brake. Thus, the load cell 6 may detect the actual braking force that is actually applied by the electrical brake actuator 15 on the brake. The load cell 6 may be electrically connected, such as by wiring, to the EBAC 4. This electrical connection may comprise sense wiring 11. Sense wiring 11 may comprise wiring that conveys information representative of the actual braking force exerted by the electrical brake actuator 15. In various embodiments, this information comprises a voltage having a magnitude corresponding to the actual braking force (referred to herein as "sensed voltage" or "signal voltage"). However, as illustrated in FIG. 2, at least one resistance disturbance caused by parasitic resistors may develop in excitation wiring 13 (discussed below) to the load cell(s) 6 (6-1 through 6-4 in FIG. 2), causing the correspondence of the sensed voltage (conveyed on the sense wiring 11) to the actual braking force to change, such as by a force error.

Figure 2:
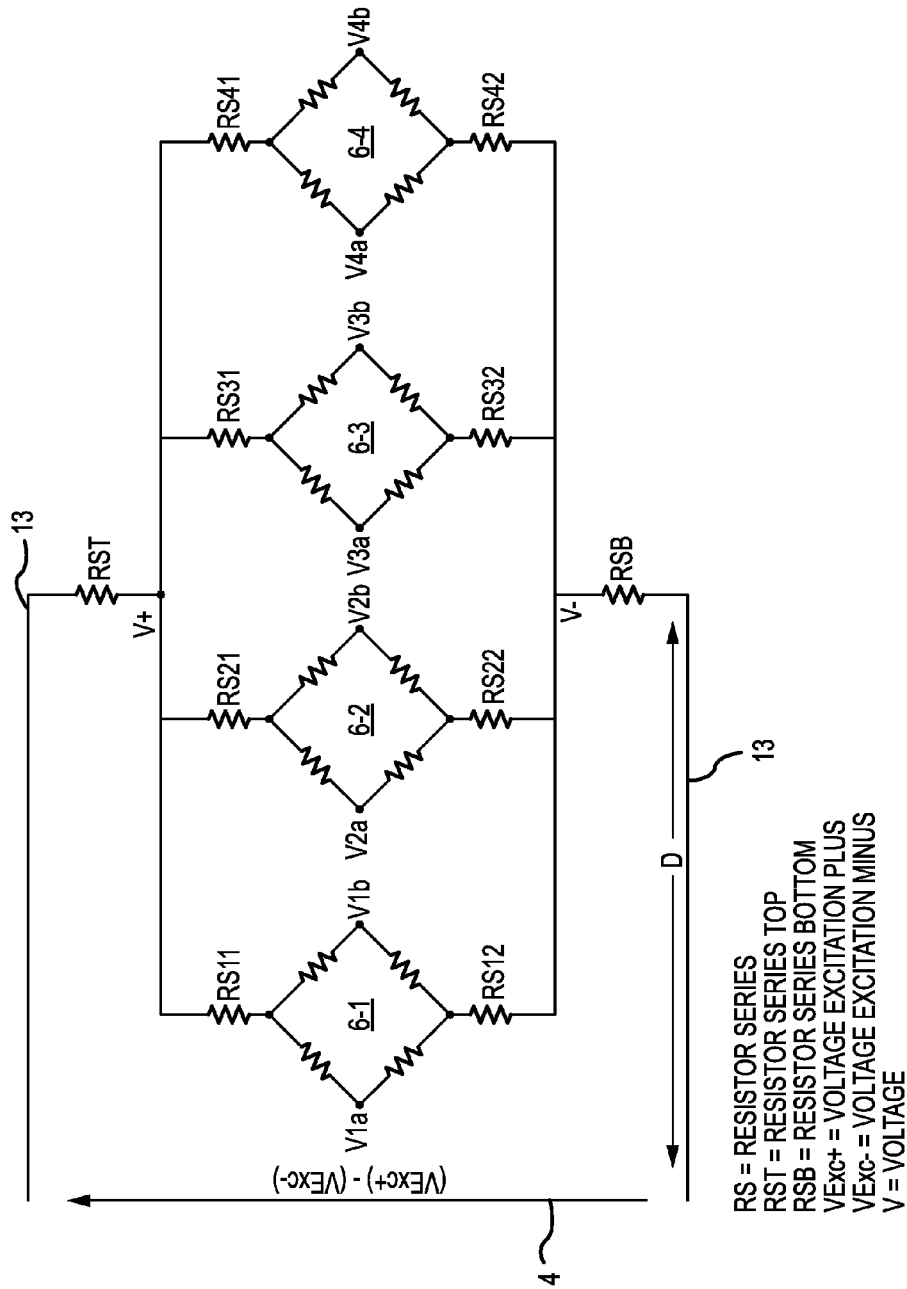
FIG. 2 depicts a schematic circuit diagram of exemplary load cell architecture in an aircraft brake control system, in accordance with various embodiments.

Still referring to FIG. 2, according to exemplary embodiments, a schematic circuit diagram of exemplary load cell architecture for the aircraft brake control system is illustrated. The depicted load cell architecture may be used in an exemplary electric brake system for an aircraft. In the exemplary embodiment illustrated in FIG. 2, the EBAC 4 is connected to a plurality of individual load cells 6-1 through 6-4 in parallel (hereinafter "parallel load cells") with shared excitation wiring 13 as hereinafter described. In the depicted embodiment, there is one load cell per actuator and four actuators for each brake. Each load cell is proximate to the brake (not shown) for a wheel (not shown) of the aircraft. The brake is configured to produce brake torque in response to a force. The plurality of electric brake actuators are configured to provide the force to the brake. While four load cells are described and illustrated, it is to be understood that any number of load cells, actuators, etc. may be used. For example, in aircraft with eight wheels, there may be 32 actuators and 32 load cells per aircraft. It is to be understood that any load cell architecture including a plurality of individual load cells in parallel with shared excitation wiring may benefit from the various embodiments disclosed herein.

As noted previously, load cells 6-1 through 6-4 (FIG. 2) are connected to the EBAC 4 by wiring, such as excitation wiring 13. The excitation wiring 13 depicted in FIG. 2 is shared by all four load cells. In some larger aircraft, the EBAC is remote from the load cells such that the excitation wiring extends over a relatively long distance (e.g., 80 or so feet) (Distance D in FIG. 2). Excitation wiring 13 may comprise wiring that conveys electrical power to the load cells 6 so that the load cells 6 may operate.

As the load cells 6 are powered by excitation wiring 13 from the EBAC 4 and provides a sensed voltage via sense wiring 11 to the EBAC 4, one will appreciate that the EBAC 4 may mathematically relate the power drawn on the excitation wiring 13 to the sensed voltage provided on the sense wiring 11. Moreover, anomalies in the current and/or voltage provided on the excitation wiring 13, such as caused by a parasitic resistor (e.g., RS11-12, RS21-22, RS31-32, RS41-42 and RST and RSB (FIG. 2)), may introduce anomalies or resistance disturbances in the sensed voltage provided on the sense wiring 11. Various methods to detect resistance disturbances indicating an uncommanded brake overdrive condition are discussed herein.

The excitation wiring 13 may develop the resistance disturbance. For instance, the excitation wiring 13 may run through connectors, may be exposed to harsh conditions, may be exposed to corrosive conditions, or may arise from wear, degradation, corrosion, introduction of connectors, repair, and/or the like. The resistance disturbance may comprise a resistance disturbance disposed in the excitation wiring 13. Referring again to FIG. 2, the resistance disturbances in the excitation wiring in the illustrated circuit diagram are simulated by the parasitic resistors in the excitation wiring. For example, individual parasitic resistors RS11 and RS12 are indicated in the excitation wiring for individual load cell 6-1, RS21 and RS22 for load cell 6-2, RS31 and RS32 for load cell 6-3, and RS41 and RS42 for load cell 6-4. The individual parasitic resistors affect only the respective individual load cell whereas the top and bottom resistors (RST and RSB) are parasitic resistors that each affects the plurality of individual load cells. More specifically, the resistance disturbances caused by parasitic resistors RST and RSB affect the plurality of load cells at the same time, whereas the resistance disturbances caused by the individual resistors cause resistance disturbances to the excitation wiring to an individual load cell. For example, parasitic individual resistors RS11 and/or RS12 cause resistance disturbances in the excitation wiring to individual load cell 6-1, RS21 and/or RS22 cause resistance disturbances in the excitation wiring to individual load cell 6-2, RS31 and/or RS32 cause resistance disturbances in the excitation wiring to individual load cell 6-3, and RS41 and/or RS42 cause resistance disturbances in the excitation wiring to individual load cell 6-4.

As such, the sensed voltage that is conveyed along the sense wiring 11 may be changed. Stated differently, the correspondence of the sensed voltage to the actual braking force may change by the force error due to the change in voltage and/or current provided to the load cells 6 as a result of a resistance disturbance in the excitation wiring 13 (multiple resistance disturbances caused by the individual resistors as well as the top and bottom resistors are depicted in FIG. 2). In various embodiments, the sensed voltage may diminish in magnitude in response to the resistance disturbance. Thus, the information may be distorted so that the sensed voltage no longer corresponds to the actual actuation, but deviates. For instance the EBAC 4 may receive information representative of the magnitude of the force exerted by the electrical brake actuator 15 indicating the exerted force is less than is actually applied to a brake. As such, the EBAC 4, perceiving an inadequate applied force, may provide a control voltage on the control wiring 12 directing the EBA 15 to provide an increased force. Thus, the actual force applied to a brake may be much greater than desired (i.e., an exemplary brake overdrive condition). For example, a resistance increase of 100 Ohm in the excitation wiring (caused by a resistance disturbance) may cause a command force of 11,250 lbf (about 50042 newtons), and if not compensated, result in an actual force of 17,000 lbf (about 75619 newtons) to be applied to the brake.

When the EBA 15 applies a force as commanded by the EBAC 4, two of the resistors of the load cell 6 bridge vary by a positive amount "+x" and the other two resistors of the load cell 6 bridge vary by a negative amount "−y" in direct proportion to the force applied by the EBA. The values "x" and "y" are usually different from each other. In FIG. 2, if all four EBAs are commanded to apply the same force (which is usually the case when there are no disturbances), then "x1"="x2"="x3"="x4" and "y1"="y2"="y3"="y4".

Various methods according to various embodiments are presented herein to detect resistance disturbances indicating an uncommanded brake overdrive condition that can contribute to increased component wear. With continued reference to FIG. 2 and referring now to FIG. 3, according to various embodiments, a method 100 for detecting an uncommanded brake overdrive condition begins by determining a nominal load cell current, $I_S$ (step 101). The nominal load cell current, $I_S$, may be the current that is drawn by the load cell 6 from the EBAC 4 along excitation wiring 13 during a first operating condition. A first operating condition may comprise a typical operating condition. A first operating condition may comprise an operating condition according to FIG. 1, wherein a parasitic resistance is absent from the excitation wiring 13. Typical operating conditions may comprise collecting a rolling average current, or collecting and storing historical current samples taken and specific times, such as start up, shut down, brake actuation, brake release, etc. The current may be correlated to a control signal provided on a control wiring 12 by the EBAC 4 indicating a desired actuation. Thus, the EBAC 4 may store a lookup table of $I_S$ values compared with control signals. The nominal load cell current may alternatively be a predetermined calculated value.

Figure 3:
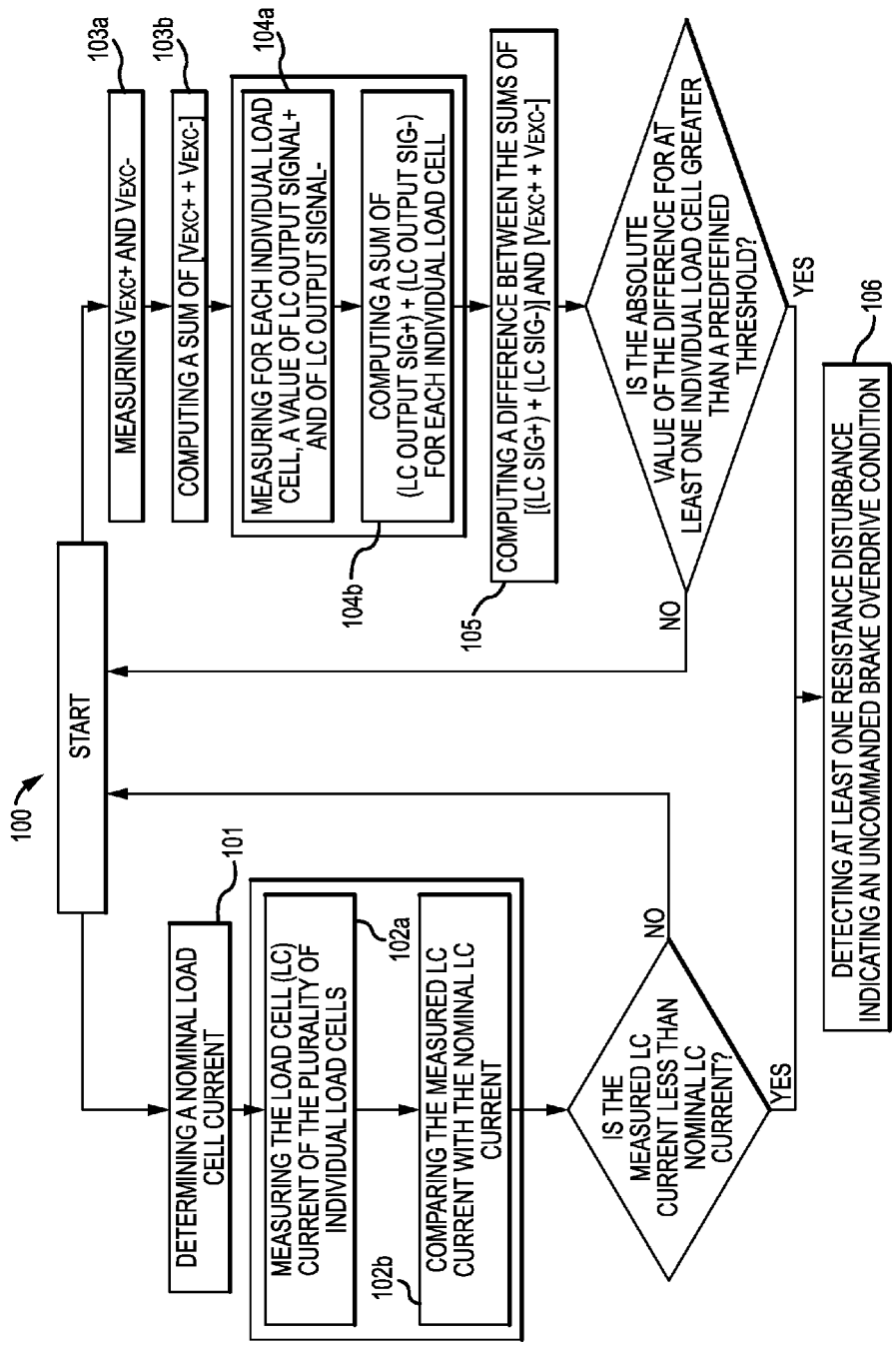
FIG. 3 depicts a flowchart illustrating an exemplary method for detecting brake overdrive conditions, in accordance with various embodiments.

Still referring to FIG. 3, method 100 for detecting an uncommanded brake overdrive condition continues by monitoring the load cell current for deviation from the nominal load cell current (steps 102a and 102b). The monitoring step comprises measuring the load cell current of the plurality of load cells in parallel (step 102a) and comparing the measured load cell current with the nominal load cell current (step 102b). The EBAC 4 may measure load cell current, $I_D$. $I_D$ may be the current that is drawn by the load cells 6 from the EBAC 4 along excitation wiring 13 in substantially real time. The EBAC 4 may compare $I_D$ and $I_S$ and determine whether $I_D<I_S$.

Method 100 for detecting an uncommanded brake overdrive condition continues by monitoring an excitation voltage signal, Vexcitation+ (Vexc+) and Vexcitation− (Vexc−) (steps 103a and 103b). The excitation voltage signal from the EBAC comprises Vexcitation+(Vexc+) and Vexcitation− (Vexc−). Step 103a comprises measuring the excitation voltage. Step 103b comprises computing a sum of the excitation voltage signals, Vexc++Vexc−. Steps 103a and 103b may be performed substantially concurrently with steps 104a and 104b as hereinafter described. The EBAC measures and computes the sum of [Vexc++Vexc−] for purposes as hereinafter described.

Method 100 for detecting an uncommanded brake overdrive condition continues by monitoring a load cell output signal of each individual load cell of the plurality of individual load cells (steps 104a and 104b). The load cell output signal comprises a (LC Sig+) output signal and a (LC Sig−) output signal for each individual load cell. Step 104a comprises measuring a load cell output for each individual load cell. Each load cell outputs a Load Cell Output Signal+ (LC Sig+) (Voltage a (V1a through V4a) in FIG. 2) and a Load Cell Output Signal− (LC Sig−) (Voltage b (V1b through V4b) in FIG. 2). The EBAC may measure the load cell output. The EBAC computes the sum of [(LC Sig+)+(LC Sig−)] for each load cell (step 104b) (known herein as "voltage summing").

Method 100 for detecting an uncommanded brake overdrive condition continues by computing a difference between the sum of (LC Sig+)+(LC Sig−) and the sum of (Vexc+)+(Vexc−) (step 105). The difference is computed by the following equation: [(LC Sig+)+(LC Sig−)]−[(Vexc+)+(Vexc−)]. Without a resistor and thus without a resistance disturbance, the sum of the load cell output signals for each load cell [LC Sig+)+(LC Sig−)] should be substantially equal to the sum of $(V_{excitation}+)+(V_{excitation}-)$ or stated another way, the difference between the sum of [(LC Sig+)+(LC Sig−)] and the sum of $[(V_{excitation}+)+(V_{excitation}-)]$ should be substantially equal to zero. As used herein, the term "substantially equal to zero" means that the difference is zero plus or minus an acceptable tolerance. The tolerance is determined by system requirements and the robustness of the system. When the absolute value of the difference is greater than a predefined threshold (zero plus or minus the acceptable tolerance), the system may detect the at least one resistor(s) and associated resistance disturbance(s) in the excitation wiring (step 106), as hereinafter described. "Absolute value" refers to the magnitude of a real number without regard to its sign.

Method 100 for detecting an uncommanded brake overdrive condition continues by detecting at least one resistance disturbance indicating the uncommanded brake overdrive condition if the load cell current is less than the nominal load cell current (as determined by steps 102a and 102b), if the absolute value of the difference between the sum of the load cell output signals for each individual load cell (i.e., the plurality of individual load cells) and the sum of the excitation signals is greater than a predefined value (as determined by steps 103, 104a and 104b), or both (step 106). The EBAC may detect the at least one resistance disturbance and indicate a system fault in response to detection of the at least one resistance disturbance. The system fault may result in a maintenance action, such as repair and/or replacement of the excitation wiring as needed. If the EBAC detects at least one resistance disturbance in step 106, the EBAC may limit the maximum applied force on the brake stack by an amount partially or fully equivalent to the difference between the load cell current and the nominal load cell current. Other remedial measures may be taken if the EBAC detects at least one resistance disturbance in step 106. For example, other remedial measures include disabling the EBAs, disabling braking capability, limiting the maximum current allowed to flow into the EBAs, etc.

It is to be noted that a resistance disturbance impacting an individual load cell may not be detected by voltage summing if there is an equivalent resistance disturbance on both sides of the individual load cell. For example, if individual resistors R11 and RS12 exist in the excitation wiring to individual load cell 6-1, but provide equivalent resistance disturbances that cancel each other out such that the sum is zero, the associated resistance disturbance may not be detected by monitoring the load cell output signal of each load cell (steps 104a and 104b). In this case, the resistors R11 and R12 and their associated resistance disturbances may only be detected by monitoring the load cell current (steps 102a and 102b).

If the measured load cell current is less than the nominal load cell current, the EBAC may detect the presence of a shared resistor such as RST or RSB in the excitation wiring. If the absolute value of the difference between the sum of the load cell output signals transmitted by only one individual load cell and the sum of the excitation voltages is greater than a predefined threshold, the EBAC may detect the presence of an individual resistor (e.g., RS11, RS12, RS21, RS22, RS31, RS32, RS41, or RS 42 in FIG. 2) that affects an individual load cell.

If the comparing step 102b indicates the load cell current is the same as or greater than the nominal load cell current, the EBAC may not detect a resistance disturbance without detecting that at least one absolute value of the difference between the sum of [(LC Sig+) and (LC Sig−)] and the sum of [($V_{excitation}$+)+($V_{excitation}$−)] is greater than the predefined threshold (i.e., steps 104a and 104b).

While steps 102a and 102b have been described as being performed prior to steps 103, 104a and 104b, it is to be understood that steps 102a and 102b may be performed simultaneously with steps 103, 104a and/or 104b, or after steps 103, 104a and/or 104b, i.e., steps 102a and 102b may be performed in parallel with steps 103, 104a, and 104b.

As discussed herein, various aspects of the present disclosure may be implemented in various logical units of a processor having a non-transitory memory. In various embodiments, various aspects may be implemented in multiple processors and/or memories. For example, the disclosed system may be implemented within the EBAC 4. Alternatively, various aspects of the disclosed system may be implemented within the EBAC 4 and/or the EBA 15 and/or the load cell 6 and/or the ABC 2. Thus, one may appreciate that the ABC 2 and/or EBAC 4 and/or the EBA 15 may comprise a processor and a tangible, non-transitory memory. For example, the ABC 2 and/or EBAC 4 may comprise a digital signal processor (DSP).

In various embodiments, while the load cell gain compensation systems and methods described herein have been described in the context of aircraft applications; however, one will appreciate in light of the present disclosure, that the systems and methods described herein may be used in connection with various other vehicles, for example, cars, trucks, busses, trains, boats, and submersible vehicles, or any other vehicle or device, in which control actuation smoothing is desirable, for example, automobile braking systems.

Tangible non-transitory memory as used herein may include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for detecting an uncommanded brake overdrive condition in a brake control system for an aircraft, the method comprising:
    monitoring, by an electric brake actuator controller (EBAC) in the brake control system, at least one of the following:
        a load cell current for deviation from a nominal load cell current; and
        a load cell output signal of an individual load cell of a plurality of individual load cells and an excitation voltage signal, the load cell output signal comprising an LC Sig+ output signal (LC Sig+) and an LC Sig− output signal (LC Sig−) and the excitation voltage signal comprising a Vexc+ signal (Vexc+) and a Vexc− signal (Vexc−); and
    detecting, by the electric brake actuator controller, at least one resistance disturbance indicating the uncommanded brake overdrive condition in response to the load cell current being less than the nominal load cell current, in response to an absolute value of a difference between a sum of the load cell output signals (LC Sig+ and LC Sig−) for at least one individual load cell of the plurality of individual load cells and a sum of the voltage excitation signals (Vexc+ and Vexc−) being greater than a predefined threshold, or both.

2. The method of claim 1, wherein detecting at least one resistance disturbance in response to the load cell current being less than the nominal load cell current comprises detecting at least one resistance disturbance in excitation wiring to the plurality of individual load cells.

3. The method of claim 1, wherein detecting at least one resistance disturbance in response to the absolute value of the difference between the sum of the load cell output signals (LC Sig+ and LC Sig−) for each individual load cell of the plurality of individual load cells and the sum of the excitation voltage signals (Vexc+ and Vexc−) being greater than the predefined threshold comprises detecting at least one resistance disturbance in excitation wiring to the plurality of individual load cells.

4. The method of claim 1, wherein detecting at least one resistance disturbance in response to the absolute value of the difference between the sum of the load cell output signals (LC Sig+ and LC Sig−) for an individual load cell of the plurality of individual load cells and the sum of (Vexc+ and Vexc−) being greater than the predefined threshold comprises detecting at least one resistance disturbance in excitation wiring to the individual load cell.

5. The method of claim 1, wherein the EBAC indicates a system fault in response to detecting the at least one resistance disturbance.

6. The method of claim 1, wherein in response to the load cell current being less than the nominal load cell current and the absolute value of the difference between the sum of the load cell output signals (LC Sig+ and LC Sig−) for the plurality of individual load cells and the sum of the excitation voltage signals (Vexc+ and Vexc−) being greater than the predefined threshold, detecting at least one resistance disturbance comprises detecting a resistance disturbance in the excitation wiring to the plurality of individual load cells.

7. The method of claim 1, wherein detecting at least one resistance disturbance comprises detecting a resistance disturbance in the excitation wiring to an individual load cell of the plurality of individual load cells in response to the absolute value of the difference between the sum of the load cell output signals (LC Sig+ and LC Sig−) for the individual load cell and the sum of (Vexc+ and Vexc−) being greater than the predefined threshold.

8. A method for detecting an uncommanded brake overdrive condition in a brake control system for an aircraft, the method comprising:
    determining, by an electric brake actuator controller (EBAC), a nominal load cell current;
    measuring, by the EBAC, a load cell current of a plurality of individual load cells in parallel, the EBAC configured to provide the load cell current to the plurality of individual load cells via shared excitation wiring;
    comparing, by the EBAC, the measured load cell current and the nominal load cell current;
    measuring, by the EBAC, a voltage excitation signal comprising a Vexc+ signal (Vexc+) and a Vexc− signal (Vexc−);
    computing, by the EBAC, a sum of the voltage excitation signals (Vexc+ and Vexc−);

measuring, by the EBAC, for each individual load cell of the plurality of individual load cells, an LC Sig+ load cell output signal (LC Sig+) and an LC Sig− load cell output signal (LC Sig−);

computing, by the EBAC, a difference between a sum of the load cell output signals (LC Sig+ and LC Sig−) for each individual load cell and the sum of the voltage excitation signals (Vexc+ and Vexc−); and detecting, by the EBAC, at least one resistance disturbance indicating the uncommanded brake overdrive condition in response to an absolute value of the difference being greater than a predefined threshold, in response to the measured load cell current being less than the nominal load cell current, or both.

9. The method of claim 8, wherein the EBAC indicates a system fault in response to detecting the at least one resistance disturbance.

10. The method of claim 8, wherein detecting at least one resistance disturbance in response to the load cell current being less than the nominal load cell current comprises detecting at least one resistance disturbance in the excitation wiring to the plurality of individual load cells.

11. The method of claim 8, wherein detecting at least one resistance disturbance in response to the absolute value of the difference between the sum of the load cell output signals (LC Sig+ and LC Sig−) for each individual load cell and the sum of the excitation voltage signals (Vexc+ and Vexc−) being greater than a predefined threshold comprises detecting at least one resistance disturbance in the excitation wiring to the plurality of individual load cells.

12. The method of claim 8, wherein detecting at least one resistance disturbance comprises detecting at least one resistance disturbance in the excitation wiring to an individual load cell of the plurality of individual load cells in response to the absolute value of the difference between the sum of the load cell output signals (LC Sig+ and LC Sig−) for the individual load cell and the sum of excitation voltage signals (Vexc+ and Vexc−) being greater than a predefined threshold.

13. The method of claim 8, wherein in response to the load cell current being less than the nominal load cell current and the absolute value of the difference between the sum of the load cell output signals (LC Sig+ and LC Sig−) for each individual load cell and the sum of the voltage excitation signals (Vexc+ and Vexc−) being greater than a predefined threshold, the step of detecting at least one resistance disturbance comprises detecting a resistance disturbance in the excitation wiring to the plurality of individual load cells.

14. The method of claim 8, wherein detecting at least one resistance disturbance comprises detecting a resistance disturbance in the excitation wiring to an individual load cell of the plurality of individual load cells in response to the absolute value of the difference between the sum of the load cell output signals (LC Sig+ and LC Sig−) for the individual load cell and the sum of the excitation voltages (Vexc+ and Vexc−) being greater than a predefined threshold.

15. The method of claim 8, wherein if the load cell current is less than the nominal load cell current, the method further comprises the step of limiting, by the EBAC, the maximum applied force on the brake stack by an amount partially or fully equivalent to the difference between the load cell current and the nominal load cell current.

16. A brake control system comprising:
an electric brake actuation controller ("EBAC");
sense wiring connected to the EBAC, wherein the EBAC is configured to receive a sensed voltage from each individual load cell of a plurality of individual load cells in parallel via the sense wiring;
shared excitation wiring connected to the EBAC, wherein the EBAC is configured to provide a load cell current to the plurality of individual load cells in parallel via the shared excitation wiring;
control wiring connected to the EBAC, wherein the EBAC is configured to provide a control voltage to an electric brake actuator ("EBA") via the control wiring, and
wherein the EBAC is further configured to detect at least one resistance disturbance in the excitation wiring indicating a brake overdrive condition in response to the load cell current being less than a nominal load cell current, in response to an absolute value of the difference between a sum of load cell control output signals (LC Sig+ and LC Sig−) from at least one individual load cell of the plurality of individual load cells and a sum of excitation voltage signals (Vexc+ and Vexc−) being greater than a predefined threshold, or both.

17. The brake control system of claim 16, wherein the plurality of individual load cells are proximate to a brake and the EBAC is remote from the plurality of individual load cells by a length of the excitation wiring.

18. The brake control system of claim 16, wherein the EBAC is further configured to detect the at least one resistance disturbance in the excitation wiring to the plurality of individual load cells in response to the load cell current being less than the nominal load cell current.

19. The brake control system of claim 16, wherein the EBAC is configured to detect the at least one resistance disturbance in the excitation wiring to the plurality of individual load cells in response to the absolute value of the difference between the sum of the load cell output signals (LC Sig+ and LC Sig−) for each individual load cell and the sum of the excitation voltage signals (Vexc+ and Vexc−) being greater than a predefined threshold.

20. The brake control system of claim 16, wherein the EBAC is further configured to detect at least one resistance disturbance in the excitation wiring to an individual load cell of the plurality of individual load cells in response the absolute value of the difference between the sum of the load cell output signals (LC Sig+ and LC Sig−) for the individual load cell and the sum of excitation voltage signals (Vexc+ and Vexc−) being greater than a predefined threshold.

* * * * *